United States Patent
Osawa et al.

(10) Patent No.: US 10,501,110 B2
(45) Date of Patent: Dec. 10, 2019

(54) STEERING SYSTEM

(71) Applicant: YAMADA MANUFACTURING CO., LTD., Kiryu-shi, Gunma (JP)

(72) Inventors: Toshihito Osawa, Kiryu (JP); Minoru Takakusaki, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 160 days.

(21) Appl. No.: 15/910,523

(22) Filed: Mar. 2, 2018

(65) Prior Publication Data

US 2018/0251149 A1 Sep. 6, 2018

(30) Foreign Application Priority Data

Mar. 6, 2017 (JP) .................................. 2017-041490

(51) Int. Cl.
*B62D 1/19* (2006.01)
*B62D 1/185* (2006.01)

(52) U.S. Cl.
CPC .............. *B62D 1/192* (2013.01); *B62D 1/185* (2013.01)

(58) Field of Classification Search
CPC . B60R 21/232; B60R 21/2338; B60R 21/214; B60R 2021/23382; B60R 2021/0011
See application file for complete search history.

(56) References Cited

U.S. PATENT DOCUMENTS

| 8,984,984 | B2 * | 3/2015 | Yokota | ..................... B62D 1/18 |
| | | | | 280/775 |
| 2003/0000330 | A1 * | 1/2003 | Murakami | ............. B62D 1/189 |
| | | | | 74/492 |
| 2003/0227163 | A1 * | 12/2003 | Murakami | ............. B62D 1/184 |
| | | | | 280/777 |
| 2013/0160595 | A1 * | 6/2013 | Moriyama | ............. B62D 1/184 |
| | | | | 74/493 |
| 2018/0347635 | A1 * | 12/2018 | Kim | .......................... F16D 3/06 |
| 2019/0031225 | A1 * | 1/2019 | Kurokawa | ............. B62D 1/184 |
| 2019/0152511 | A1 * | 5/2019 | Shiroishi | ................ B62D 1/192 |
| 2019/0152512 | A1 * | 5/2019 | Ku | ......................... B62D 1/195 |
| 2019/0283792 | A1 * | 9/2019 | Suzuki | .................... B62D 1/184 |

FOREIGN PATENT DOCUMENTS

JP       2004-009837       1/2004

* cited by examiner

*Primary Examiner* — Darlene P Condra
(74) *Attorney, Agent, or Firm* — Rankin, Hill & Clark LLP (57) ABSTRACT

A steering system includes an inner column; an outer column including a guide tube part that supports the inner column to be movable in an axial direction and a holding tube part in which a slit extending in the axial direction is formed; and a telescopic adjustment mechanism that switches between a locked state in which an interval of the slit is reduced and movement of the inner column is regulated and an unlocked state in which the interval of the slit is increased and the movement of the inner column is allowed. An inner circumferential surface of the guide tube part has support surfaces that slidably support an outer circumferential surface of the inner column, and flanks located on the same circumference as the support surfaces and are separated from the outer circumferential surface of the inner column in a radial direction.

5 Claims, 10 Drawing Sheets

STEERING SYSTEM

BACKGROUND OF THE INVENTION

Field of the Invention

The present invention relates to a steering system. Priority is claimed on Japanese Patent Application No. 2017-041490, filed on Mar. 6, 2017, the content of which is incorporated herein by reference.

Description of Related Art

Some steering systems have a telescopic function of adjusting a front/rear position of a steering wheel according to a difference in body type or a driving posture of a driver (e.g., see Japanese Unexamined Patent Application, First Publication No. 2004-9837). The steering system set forth in Japanese Unexamined Patent Application, First Publication No. 2004-9837 includes an inner column and an outer column into which the inner column is inserted. The inner column rotatably supports a steering shaft on which the steering wheel is mounted. The outer column is mounted on a vehicle body via a bracket, and supports the inner column and the steering shaft to be movable in an axial direction (a forward/backward direction).

In the steering systems having the telescopic function, when a predetermined load acts on the steering wheel in the event of secondary collision, the inner column and the steering shaft may be moved in the axial direction along with the steering wheel. According to the configuration, a shock load applied to the driver in the event of secondary collision is relieved by sliding resistance or the like between the outer column and the inner column.

In the steering systems, it is required to secure an amount of movement of the inner column relative to the outer column in the axial direction and to further improve a shock absorption capacity in the event of secondary collision.

However, in the steering systems, when a direction in which a collision load is input intersects the axial direction of the inner column, a component force of the collision load acts in a radial direction (an upward/downward direction) perpendicular to the axial direction. In this case, the inner column tends to rotate in the radial direction (so-called twisting occurs). For this reason, in the conventional steering systems, in terms of securing the amount of movement of the inner column in the axial direction, there is still room for improvement.

SUMMARY OF THE INVENTION

The present invention provides a steering system capable of further improving a shock absorption capacity in the event of secondary collision.

According to a first aspect of the present invention a steering system includes: an inside member configured to extend along an axis and to have a steering wheel mounted on a first end side in an axial direction; an outside member including a guide tube part into which the inside member is inserted to support the inside member to be movable in the axial direction, and a holding part which is located on the first end side in the axial direction with respect to the guide tube part and in which a slit extending in the axial direction is formed; and a telescopic adjustment mechanism configured to switch between a locked state in which an interval of the slit is reduced and movement of the inside member relative to the outside member is regulated by the holding part and an unlocked state in which the interval of the slit is increased and the movement of the inside member relative to the outside member is allowed. An inner circumferential surface of the guide tube part includes support surfaces that slidably support an outer circumferential surface of the inside member, and flanks that are located on the same circumference as the support surfaces and are separated from the outer circumferential surface of the inside member in a radial direction.

According to a second aspect of the present invention, a steering system includes: an inside member configured to extend along an axis and to have a steering wheel mounted on a first end side in an axial direction; an outside member including a guide tube part into which the inside member is inserted to support the inside member to be movable in the axial direction, and a holding part that is located on the first end side in the axial direction with respect to the guide tube part; and a telescopic adjustment mechanism configured to switch between a locked state in which movement of the inside member relative to the outside member is regulated by the holding part and an unlocked state in which the movement of the inside member relative to the outside member is allowed. An inner circumferential surface of the guide tube part has support surfaces that slidably support an outer circumferential surface of the inside member, and flanks that are located on the same circumference as the support surfaces and are separated from the outer circumferential surface of the inside member in a radial direction.

According to each of the aspects, the support surfaces of the guide tube part slidably support the inside member on the side opposite to the first end side (the second end side) with respect to the holding part in the outside member. For this reason, in the event of secondary collision, rotation of the inside member in the radial direction due to a load acting on the steering wheel can be regulated, and occurrence of twisting can be suppressed. Thereby, the inside member can be made to smoothly move in the axial direction, and a desired amount of stroke in the axial direction in the event of secondary collision can be secured. As a result, a shock absorption capacity in the event of secondary collision can be further improved.

Furthermore, in the aspects, since the flanks, which are located on the same circumference as the support surfaces and are separated from the inside member, are formed on the inner circumferential surface of the guide tube part, an opening can be provided in the guide tube part, for instance, in a direction in which twisting does not easily occur. Thereby, the weight of the outside member can be reduced.

Areas of the support surfaces (and the flanks) are changed, and thereby a contact area between the inside member and the guide tube part can be changed. Thereby, since sliding resistance between the inside member and the support surface can be changed, an amount of absorption of the collision load can be changed. For example, a contact area between the inside member and the support surface is increased, and thereby the amount of absorption of the collision load can be increased. On the other hand, the contact area between the inside member and the support surface is reduced, and thereby the amount of absorption of the collision load is reduced. In this way, the areas of the support surfaces (and the flanks) are changed, and thereby an amount of absorption (sliding resistance) of the shock load can be changed. For this reason, even when the required amount of absorption of the shock load varies, a desired shock absorption capacity can be obtained with no significant change in design. The contact area between the inside member and the support surface is reduced, and thereby the areas of the flanks are increased, so that a reduction in weight can be achieved.

According to a third aspect of the present invention, the support surfaces may be arranged at positions facing each other in an upward/downward direction of a vehicle in a front view in the axial direction, and the flanks may be arranged at positions facing each other in a width direction of the vehicle in the front view in the axial direction.

According to the aspects, the support surfaces are arranged in the upward/downward direction of the vehicle in which twisting easily occurs, and thereby twisting in the event of secondary collision can be reliably suppressed.

According to a fourth aspect of the present invention, an inner shape of the guide tube part may be formed in an oval shape. Portions of the guide tube part which face each other in a direction of a minor axis may be set as the support surfaces, and portions of the guide tube part which face each other in a direction of a major axis may be set as the flanks.

According to the aspects, since the inner shape of the guide tube part is formed in the oval shape, the inner shape of the guide tube part can be simplified. For this reason, the aforementioned operations and effects are exhibited while improving manufacturing efficiency.

According to a fifth aspect of the present invention, an opening passing through the outside member in the radial direction may be formed at portions of the outside member which are located on a second end side in the axial direction with respect to the guide tube part.

According to the aspects, since the opening is formed on the second end side in the axial direction with respect to the guide tube part (at portions located across the guide tube part on the side opposite to the slit in the axial direction), the weight of the outside member can be further reduced while the occurrence of the aforementioned twisting is suppressed.

According to the steering system of the present invention, a shock absorption capacity in the event of secondary collision can be further improved.

DETAILED DESCRIPTION OF THE INVENTION

Hereinafter, an embodiment of the present invention will be described on the basis of the drawings.

[Steering System]

Figure 1:
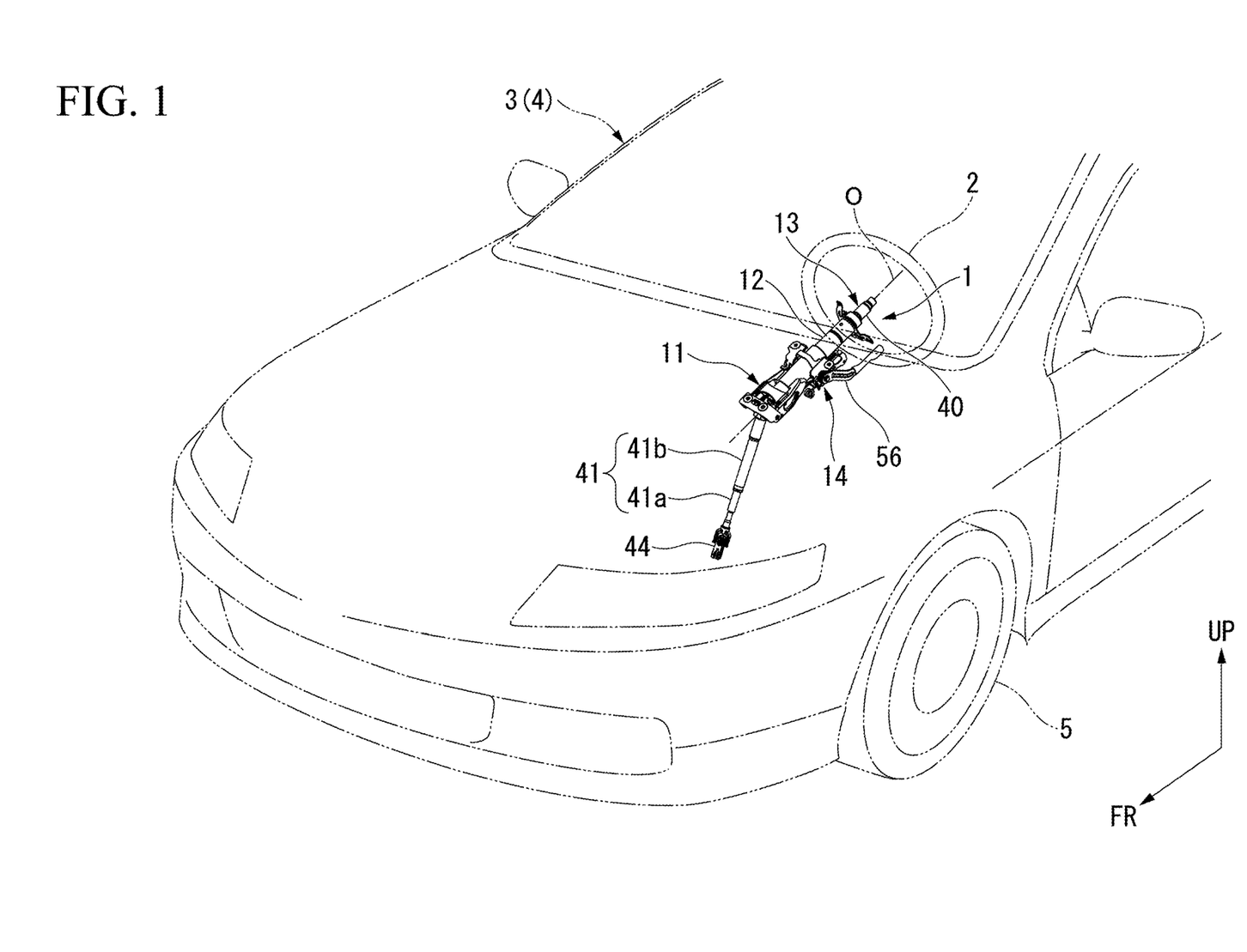
FIG. 1 is a perspective view of a vehicle in which a steering system according to an embodiment is mounted.

FIG. 1 is a perspective view of a vehicle 3 in which a steering system 1 is mounted.

As illustrated in FIG. 1, the steering system 1 is mounted in the vehicle 3. The steering system 1 adjusts a steering angle for wheels 5 according to a rotating operation of a steering wheel 2. In the following description, unless otherwise stated, directions of front, rear, up, down, left, right, etc. are the same as directions in the vehicle 3. In the drawings, an arrow UP indicates an upper side, and an arrow FR indicates a front side.

Figure 2:
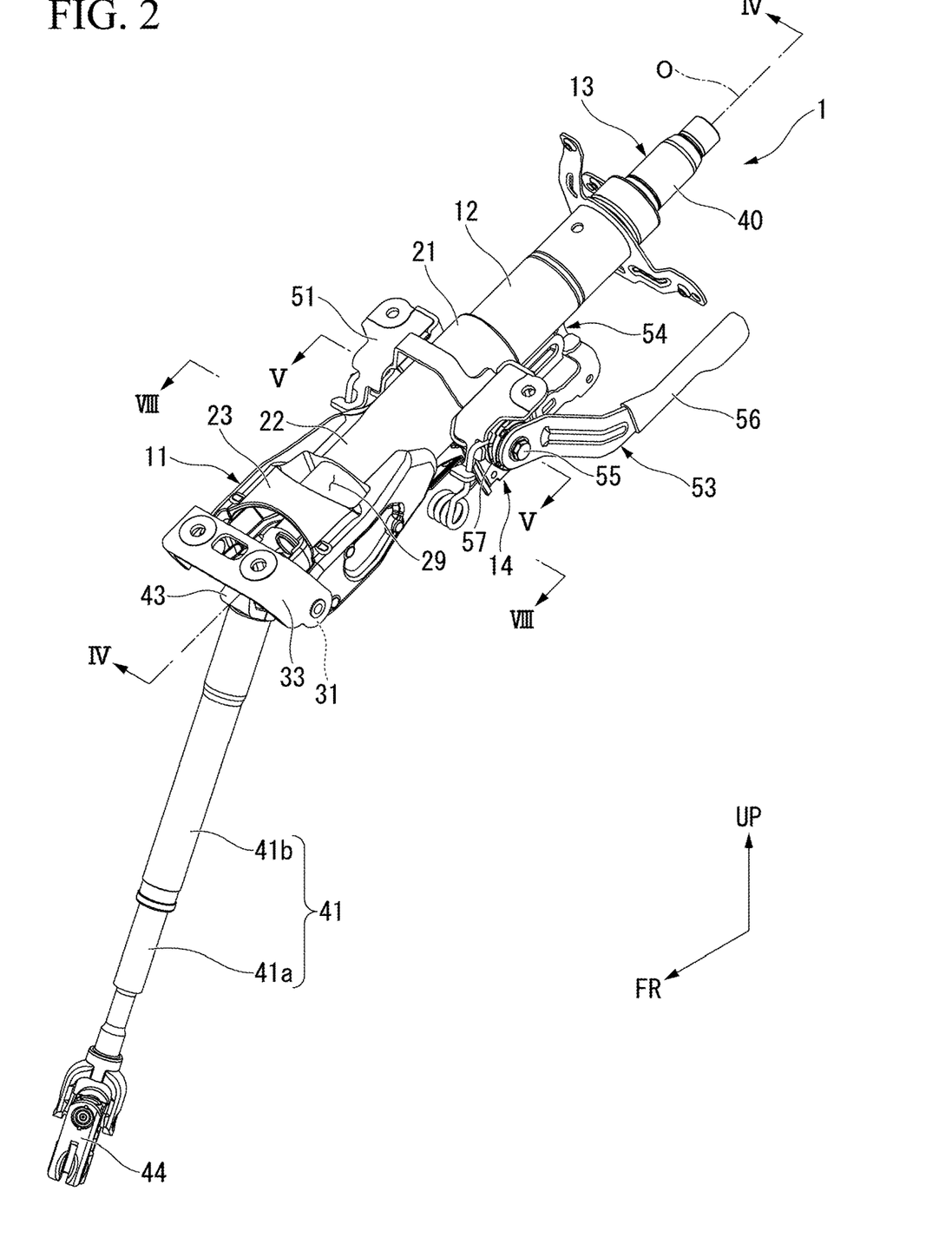
FIG. 2 is a perspective view of the steering system according to the embodiment.

FIG. 2 is a perspective view of the steering system 1.

As illustrated in FIG. 2, the steering system 1 generally includes an outer column (an outside member) 11, an inner column (an inside member) 12, a steering shaft (an inside member) 13, and a telescopic adjustment mechanism 14. In the steering system 1 of the present embodiment, an axis O of the inner column 12 and an axis O of the steering shaft 13 (a rear shaft 40 to be described below) are coaxially arranged. In the following description, a direction in which the axes O of the inner column 12 and the steering shaft 13 extend may be referred to simply as an axial direction, a direction perpendicular to the axes O may be referred to as a radial direction, and a direction that circles around the axes O may be referred to as a circumferential direction.

The steering system 1 of the present embodiment is disposed such that the axis O intersects a forward/backward direction. To be specific, the axis O of the steering system 1 extends upward toward a rear side. However, in the following description, for the sake of convenience, in the steering system 1, a direction toward the steering wheel 2 in the axial direction is referred to as a rear side (a first end side), and a direction toward a side opposite to the steering wheel 2 is referred to as a front side (a second end side). Among the radial directions, a direction parallel to an upward/downward direction of the vehicle is referred to as an upward/downward direction, and a direction parallel to a width direction of the vehicle is referred to as a lateral direction.

<Outer Column>

The outer column 11 is formed in a tubular shape in which a front part thereof is formed with a larger diameter than a rear part thereof. The inner column 12 is inserted into the outer column 11. The outer column 11 supports the inner column 12 to be movable in the axial direction. To be specific, the outer column 11 has a holding tube part (a holding part) 21, a guide tube part 22, and a large-diameter tube part 23 that are formed to continue from a rear side to a front side.

Figure 3:
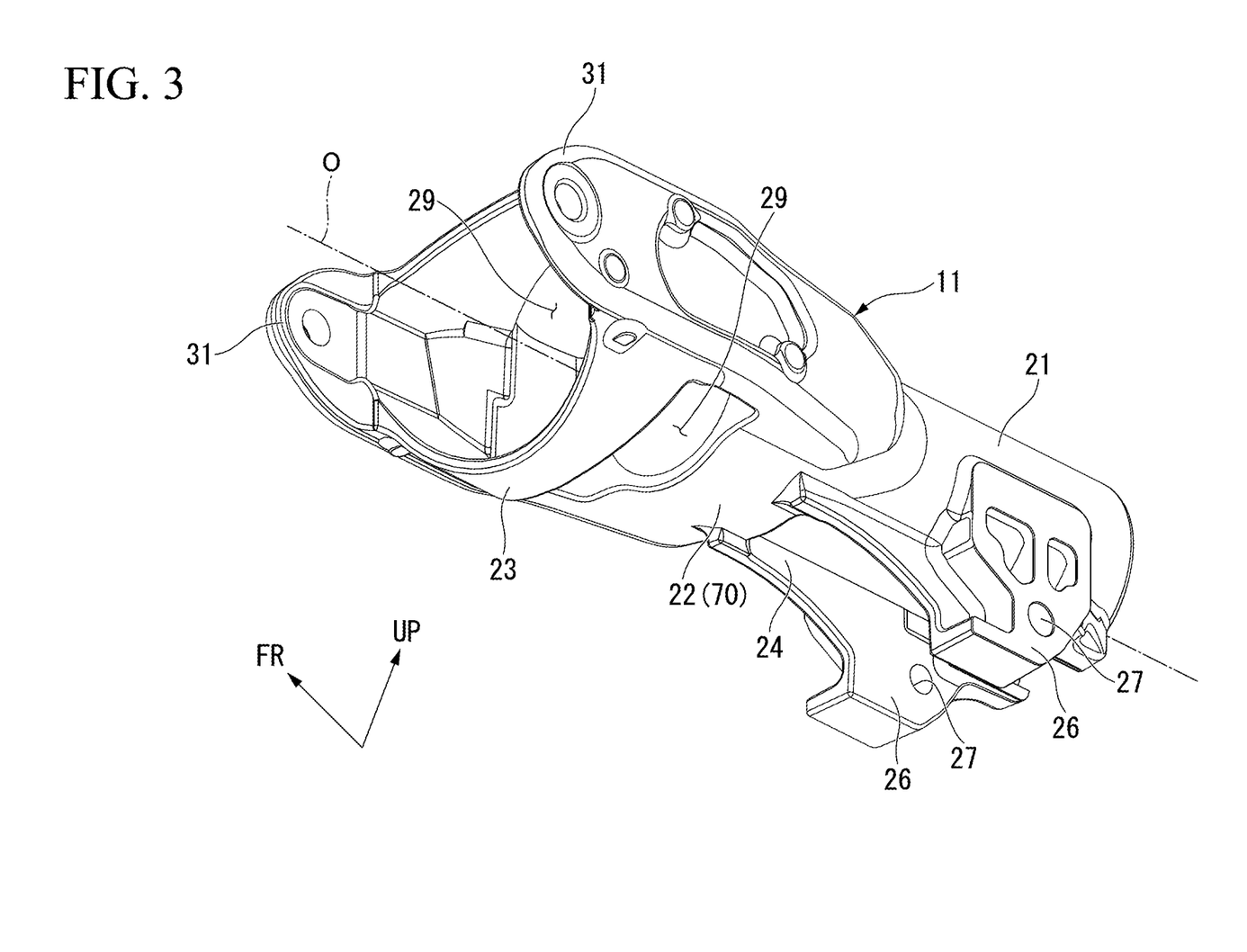
FIG. 3 is a perspective view of an outer column.

FIG. 3 is a perspective view of the outer column 11. The outer column 11 is fixed to a vehicle body 4 (see FIG. 1) by a rear bracket 51 (to be described below).

As illustrated in FIG. 3, the holding tube part 21 is formed in a cylindrical shape that is disposed coaxially with the axis O. That is, a radius of curvature on an inner circumferential surface of the holding tube part 21 is uniformly formed around the axis O throughout the circumference. A slit 24 is formed in a part of the holding tube part 21 in the circumferential direction (a lower portion of the holding tube part 21 in the present embodiment). The slit 24 passes through the holding tube part 21 in the radial direction (in the upward/downward direction), and extends in the axial direction. The slit 24 is formed throughout the holding tube part 21 in the axial direction. If the slit 24 extends in the axial direction as a whole, the slit 24 may extend to be slightly inclined in the axial direction.

In the holding tube part 21, fastening parts 26 are formed at portions opposite to each other across the slit 24. The fastening parts 26 are integrally formed at the holding tube part 21.

The fastening parts 26 run downward from the holding tube part 21. Through-holes 27 passing through the fastening parts 26 in the lateral direction are formed in the fastening parts 26.

The guide tube part 22 runs forward from a rear end edge of the holding tube part 21 in the axial direction. The guide tube part 22 supports the inner column 12 to be slidable in the axial direction. The guide tube part 22 will be described below in detail.

Figure 4:
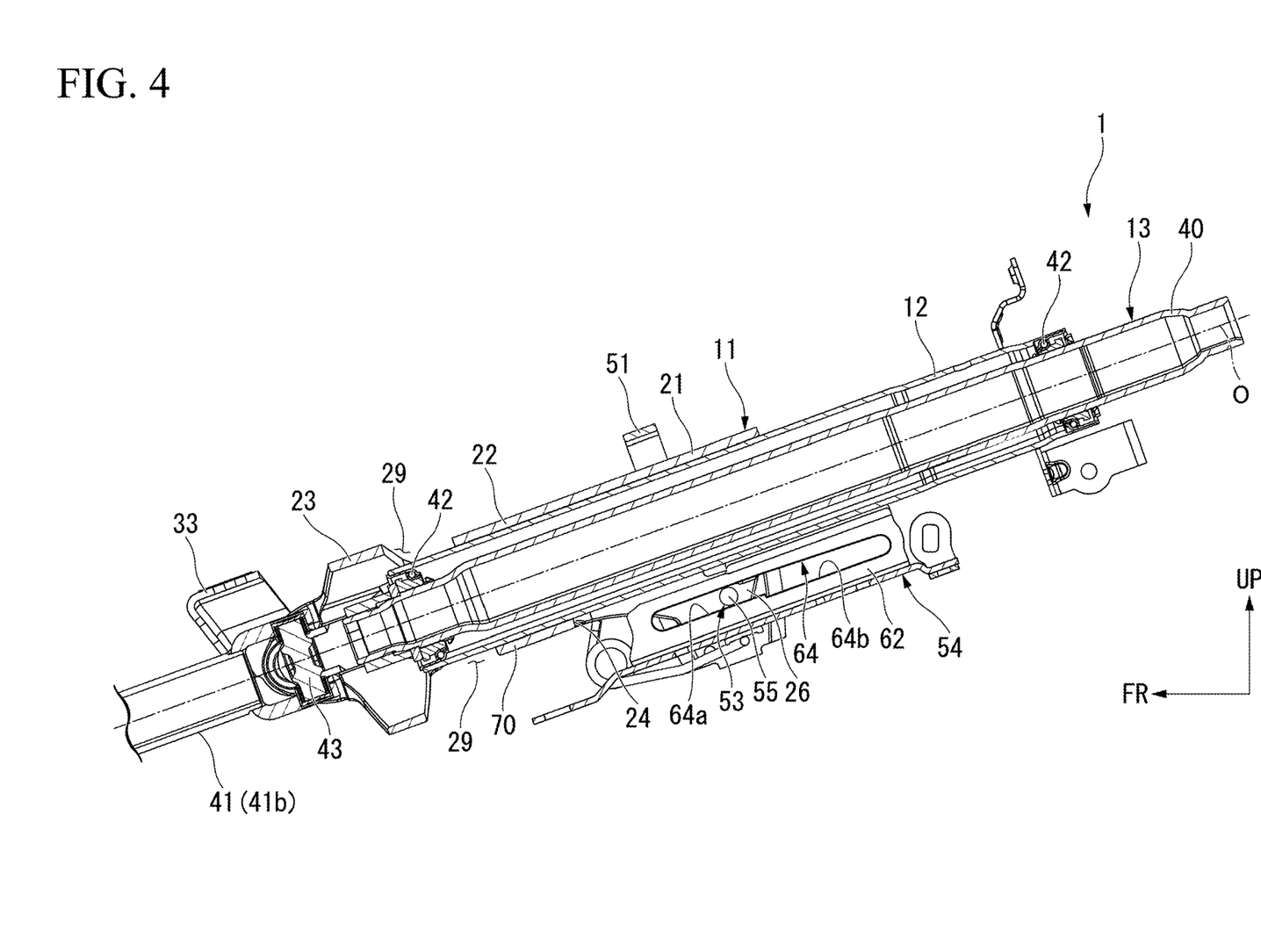
FIG. 4 is a sectional view taken along line IV-IV of FIG. 2.

FIG. 4 is a sectional view taken along line IV-IV of FIG. 2.

As illustrated in FIGS. 3 and 4, the large-diameter tube part 23 runs backward from a rear end edge of the guide tube part 22 in the axial direction. The large-diameter tube part 23 is formed in a circular shape that is flat in the upward/downward direction, for instance, in a front view in the axial direction. A distance between the axis O and an inner circumferential surface of the large-diameter tube part 23 in the radial direction is set to such a length that an outer circumferential surface of the inner column 12 is not in contact with the inner circumferential surface of the large-diameter tube part 23 throughout the circumference.

In the large-diameter tube part 23, an opening 29 passing through the large-diameter tube part 23 in the upward/downward direction are formed at portions opposite to each other in the upward/downward direction. The opening 29 is formed in a rectangular shape in a top view in the upward/downward direction. A position, a shape, a size, etc. of each of the opening 29 can be appropriately changed.

At a front end edge of the large-diameter tube part 23, coupling protrusions 31 protruding forward in the axial direction are formed at portions opposite to each other in the lateral direction. Each of the coupling protrusions 31 is integrally formed at the large-diameter tube part 23. As illustrated in FIG. 2, a front bracket 33 is coupled to the coupling protrusions 31. The front bracket 33 fixes the outer column 11 (the steering system 1) to the vehicle body 4 (see FIG. 1) via the coupling protrusions 31.

<Inner Column>

As illustrated in FIG. 4, the inner column 12 is formed in a cylindrical shape that extends in the axial direction.

An outer diameter of the inner column 12 is slightly smaller than an inner diameter of the holding tube part 21 or the guide tube part 22 described above. The inner column 12 is inserted into the outer column 11. The inner column 12 is supported to the holding tube part 21 or the guide tube part 22 to be slidable on an inner circumferential surface of the holding tube part 21 or the guide tube part 22 described above. In the example of FIG. 4, a length of the inner column 12 in the axial direction is longer than a length of the outer column 11 in the axial direction.

<Steering Shaft>

The steering shaft 13 includes a rear shaft 40 and a front shaft 41 (see FIG. 2). The rear shaft 40 is supported inside the aforementioned inner column 12 via bearings 42 to be rotatable about the axis O. A rear end of the rear shaft 40 protrudes backward beyond a rear end of the inner column 12 in the axial direction. The steering wheel 2 (see FIG. 1) is coupled to the rear end of the rear shaft 40.

The front shaft 41 is coupled to a front end of the rear shaft 40 via a first universal joint 43. That is, the front shaft 41 is configured to be swingable relative to the rear shaft 40. The front shaft 41 is configured to be expandable in a direction in which the front shaft 41 extends. As illustrated in FIG. 2, the front shaft 41 has a multistage shaft (an inside shaft 41*a* and an outside shaft 41*b*). The inside shaft 41*a* moves forward/backward relative to the outside shaft 41*b*, and thereby the front shaft 41 is expanded/contracted. In the present embodiment, for example a male spline formed at a rear end of the inside shaft 41*a* is engaged with a female spline formed inside the outside shaft 41*b*. Thereby, forward/backward movement of the shafts 41*a* and 41*b* is allowed while regulating relative rotation between the shafts 41*a* and 41*b*. However, an expandable structure of the front shaft 41 can be appropriately changed.

As illustrated in FIG. 1, a second universal joint 44 is coupled to a front end of the front shaft 41. The second universal joint 44 is coupled to an input shaft of a steering gear box (not shown). In the steering system 1, a rotating force of the steering shaft 13 is transmitted to the steering gear box, and thereby the wheels 5 are steered.

<Telescopic Adjustment Mechanism>

As illustrated in FIG. 2, the telescopic adjustment mechanism 14 switches between a locked state in which movement of the inner column 12 (and the steering shaft 13) relative to the outer column 11 in the forward/backward direction is regulated and an unlocked state in which the movement in the forward/backward direction is allowed. To be specific, the telescopic adjustment mechanism 14 generally includes a rear bracket 51, an operation mechanism 53, and a guide rail 54.

The rear bracket 51 is disposed at a position equivalent to the aforementioned fastening parts 26 (see FIG. 3) in the axial direction. The rear bracket 51 is formed to enclose both left and right sides and an upper side of the outer column 11. The rear bracket 51 has lateral plate parts 51*a* and 51*b* on both left and right sides thereof. The lateral plate parts 51*a* and 51*b* pinch the outer column 11 from both of the left and right sides. The rear bracket 51 fixes the steering system 1 to the vehicle body 4 (see FIG. 1) via the outer column 11.

Figure 5:
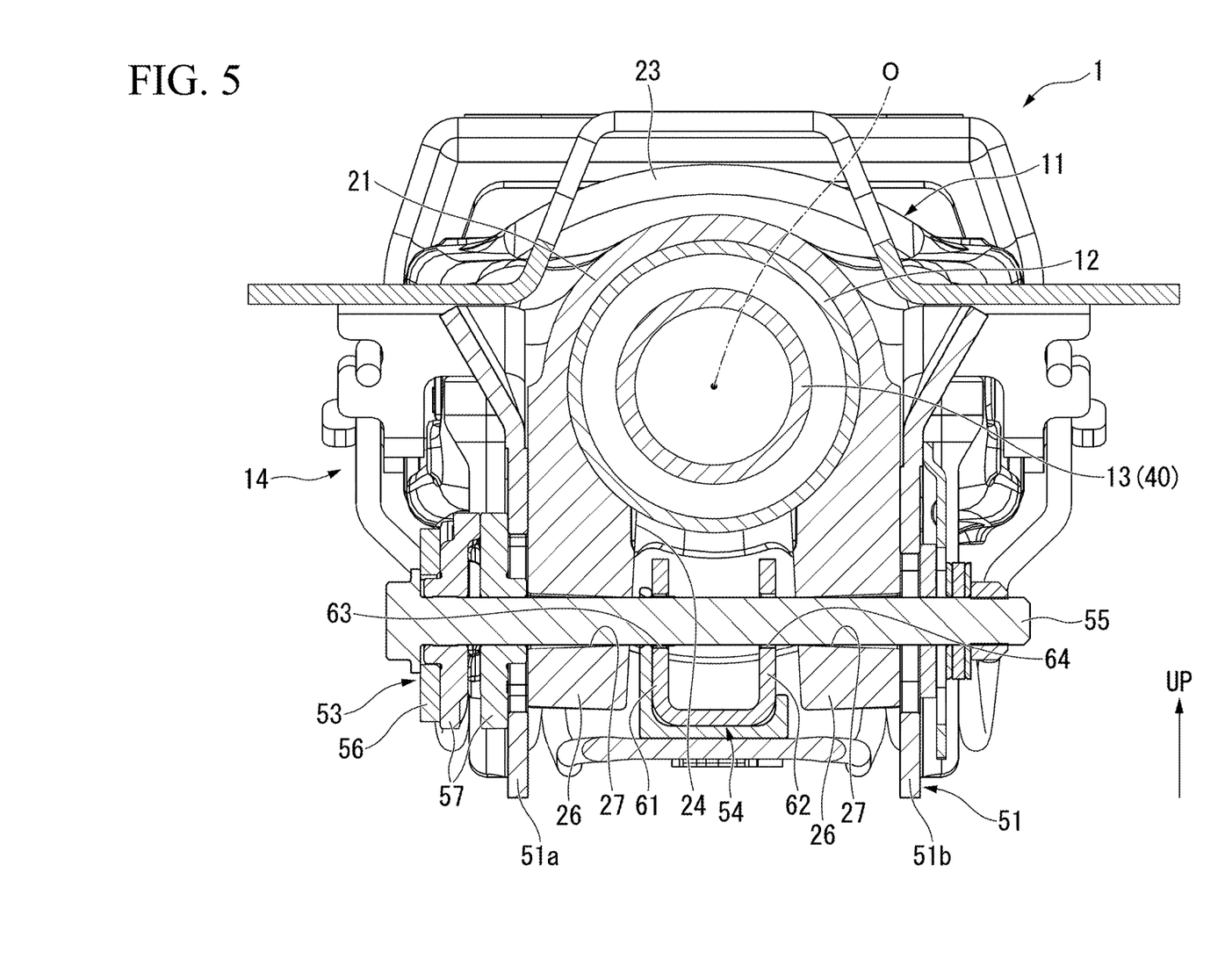
FIG. 5 is a sectional view taken along line V-V of FIG. 2.

FIG. 5 is a sectional view taken along line V-V of FIG. 2.

As illustrated in FIGS. 2 and 5, the operation mechanism 53 generally includes a pivot 55, an operation lever 56, and a fastening cam 57. The pivot 55 is inserted into the through-holes 27 of the aforementioned fastening parts 26, and is provided to pass through the rear bracket 51 in the lateral direction.

As illustrated in FIG. 2, the operation lever 56 is coupled to a first end (a left end in FIG. 2) of the pivot 55 in the lateral direction. The operation lever 56 is configured to be pivotable about the pivot 55.

As illustrated in FIG. 5, the fastening cam 57 is interposed between the operation lever 56 and the lateral plate part 51*a* of the rear bracket 51. The fastening cam 57 is configured such that a thickness thereof in the lateral direction varies with pivotal operation of the operation lever 56. In the steering system 1, the thickness of the fastening cam 57 varies, and thereby the fastening cam 57 is configured such that the fastening parts 26 move toward or away from each other in the lateral direction via the lateral plate parts 51*a* and 51*b* (such that a width (an interval) of the slit 24 in the lateral direction increases or decreases). To be specific, the operation lever 56 is pivotally operated such that the thickness of the fastening cam 57 increases, and thereby the fastening parts 26 move toward each other along with the lateral plate parts 51*a* and 51*b*, so that the diameter of the holding tube part 21 is reduced. Thereby, the inner column 12 is pinched by the holding tube part 21, and the movement of the inner column 12 relative to the outer column 11 in the forward/backward direction is regulated (the locked state).

Meanwhile, in the locked state, the operation lever 56 is pivotally operated such that the thickness of the fastening cam 57 decreases, and thereby the fastening parts 26 move away from each other along with the lateral plate parts 51a and 51b so that the diameter of the holding tube part 21 is increased. Thereby, the pinching of the inner column 12 caused by the holding tube part 21 is released, and the movement of the inner column 12 relative to the outer column 11 in the forward/backward direction is allowed (the unlocked state).

The guide rail 54 is fixed to a lower portion of the inner column 12. The guide rail 54 protrudes downward through the slit 24 of the outer column 11, and is disposed between the fastening parts 26. The guide rail 54 includes a pair of facing wall parts (a first facing wall part 61 and a second facing wall part 62) that face each other in the lateral direction. The facing wall parts 61 and 62 and the fastening parts 26 are separated in the lateral direction even when the steering system 1 is in the locked state described above.

The first facing wall part 61 is formed with a first guide hole 63 passing through the first facing wall part 61 in the lateral direction. The second facing wall part 62 is formed with a second guide hole 64 passing through the second facing wall part 62 in the lateral direction. The guide holes 63 and 64 are long holes extending in the axial direction. The aforementioned pivot 55 is inserted into the guide holes 63 and 64 to be movable relative to the guide rail 54 in the axial direction.

Figure 6:
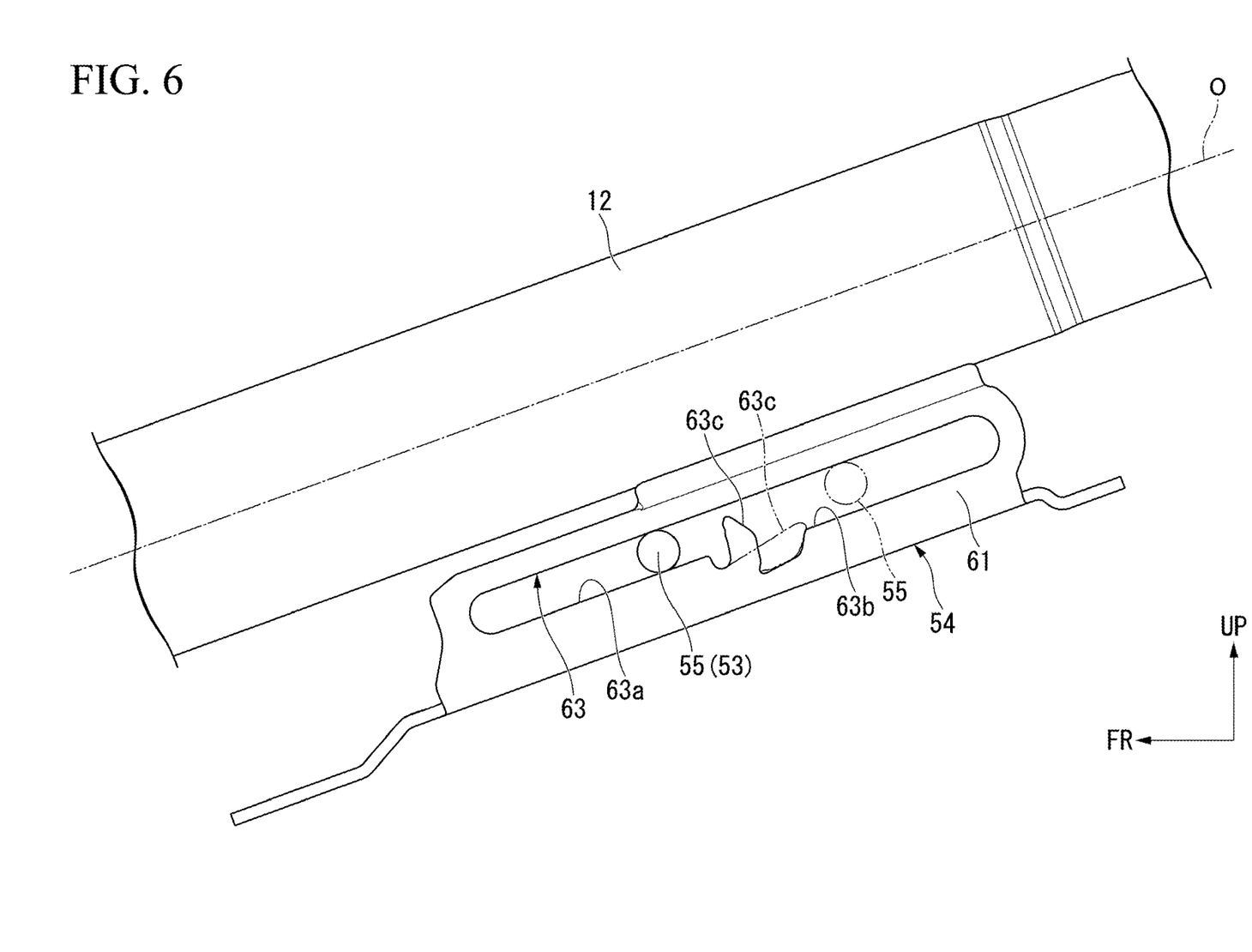
FIG. 6 is a side view of a guide rail from a left side.

FIG. 6 is a side view of the guide rail 54 from a left side.

As illustrated in FIG. 6, the first guide hole 63 has a telescopic region 63a, and a load absorption region 63b that continues backward in the axial direction with respect to the telescopic region 63a.

A width of the telescopic region 63a in the upward/downward direction is uniformly formed. With the movement of the inner column 12 relative to the outer column 11, the pivot 55 moves within the telescopic region 63a relative to the inner column 12 in the axial direction.

A projected segment 63c is formed at a boundary portion between the telescopic region 63a and the load absorption region 63b at a lower end edge of the guide hole 63. The projected segment 63c is located on a movement locus of the pivot 55 in the axial direction. During telescopic adjustment (front/rear position adjustment), the pivot 55 comes into contact with the projected segment 63c, and thereby the projected segment 63c is configured to regulate a telescopic adjustment range. In addition, for instance, the projected segment 63c is configured to fall backward with a lower end as a fulcrum when a shock in the event of secondary collision is transmitted via the pivot 55. That is, with backward movement of the pivot 55 relative to the guide rail 54, the projected segment 63c falls in the load absorption region 63b, and thereby a shock load in the event of secondary collision is relieved. The projected segment 63c may protrude downward from an upper end edge of the load absorption region 63b. An amount of projection, an axial width, etc. of the projected segment 63c can be appropriately changed.

Figure 7:
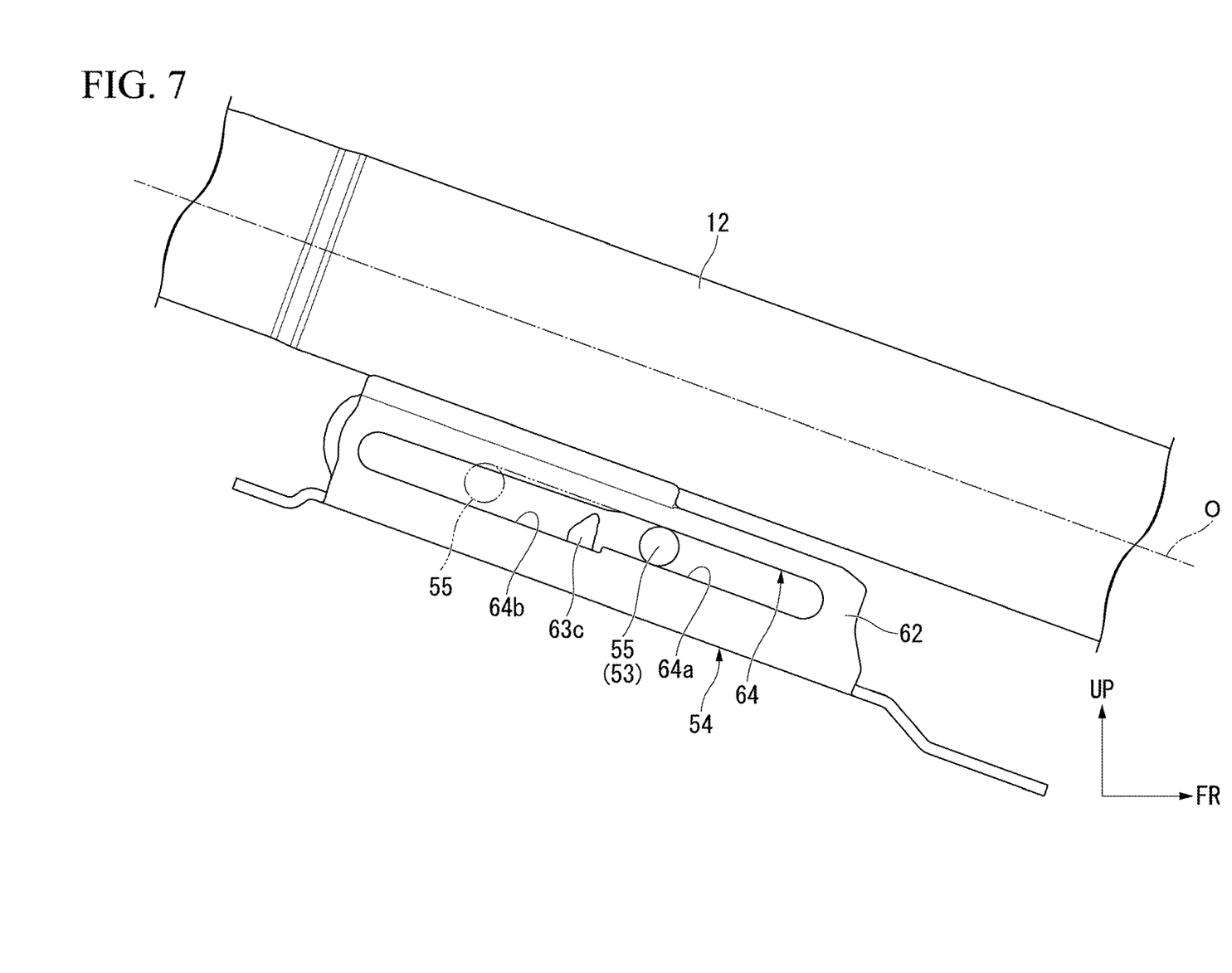
FIG. 7 is a side view of the guide rail from a right side.

FIG. 7 is a side view of the guide rail 54 from a right side.

As illustrated in FIG. 7, the second guide hole 64 has a telescopic region 64a and a load absorption region 64b that continues backward in the axial direction with respect to the telescopic region 64a.

The telescopic region 64a has a configuration equivalent to that of the aforementioned telescopic region 63a of the first guide hole 63.

An upper end edge of the load absorption region 64b gradually extends downward from an upper end edge of the telescopic region 64a to a rear side. A lower end edge of the load absorption region 64b is lowered from a lower end edge of the telescopic region 64a by one step, and then extends backward in the axial direction. In the load absorption region 64b, with the backward movement of the pivot 55 relative to the guide rail 54, the upper end edge of the load absorption region 64b is deformed (crushed), and thereby the shock load in the event of secondary collision is relieved.

In the present embodiment, shapes of the load absorption regions 63b and 64b are made different in the guide holes 63 and 64, but the shapes of the load absorption regions 63b and 64b may be the same. The shapes of the load absorption regions 63b and 64b can be appropriately changed as long as the load absorption regions 63b and 64b has a configuration in which the shock in the event of secondary collision is absorbed. For example, a width of each of the load absorption regions 63b and 64b in the upward/downward direction is set to be smaller than a diameter of the pivot 55, and the load absorption regions 63b and 64b may be configured to be pushed and widened with the movement of the pivot 55. The projected segment 63c may be configured to be formed in each of the guide holes 63 and 64.

<Guide Tube Part>

Figure 8:
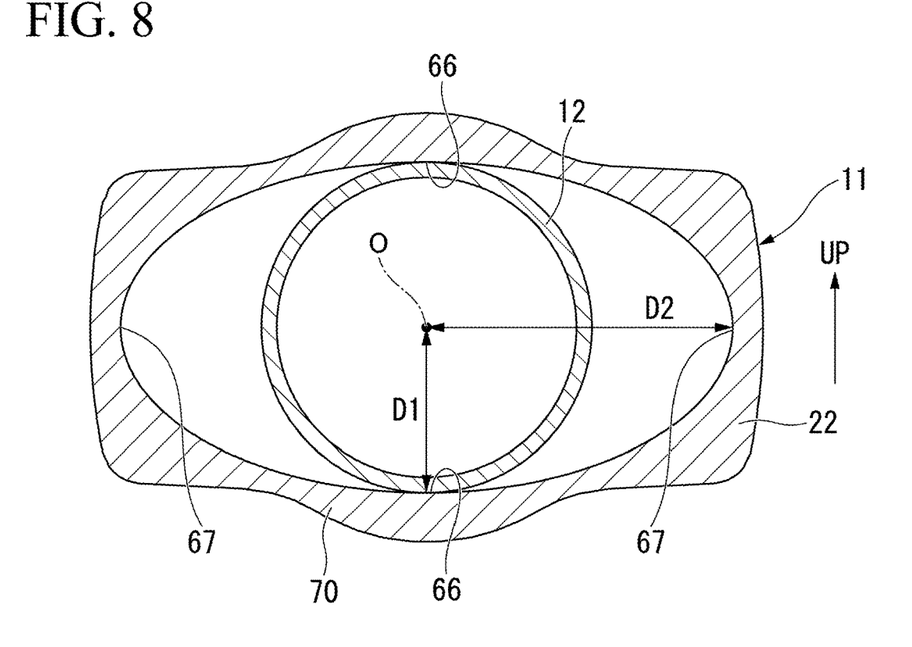
FIG. 8 is a sectional view corresponding to line VIII-VIII of FIG. 2.

FIG. 8 is a sectional view corresponding to line VIII-VIII of FIG. 2.

As illustrated in FIG. 8, an inner shape of the aforementioned guide tube part 22 is formed in an oval shape in a front view in the axial direction. To be specific, in the front view in the axial direction, the inner shape of the guide tube part 22 has a major axis extending in the lateral direction, and a minor axis extending in the upward/downward direction. The inner shape of the guide tube part 22 is uniformly formed throughout the axial direction. However, at least a part of the guide tube part 22 in the axial direction may be formed in an oval shape.

Some regions of the inner circumferential surface of the guide tube part 22 in the circumferential direction including portions facing each other in a direction of the minor axis are formed into support surfaces 66. The support surfaces 66 slidably support the outer circumferential surface of the inner column 12. A distance D1 from the axis O to the support surface 66 in the radial direction is equal to a radius of curvature of the inner circumferential surface of the aforementioned holding tube part 21 (a distance from the axis O to the inner circumferential surface of the holding tube part 21). In the present embodiment, the holding tube part 21 and the guide tube part 22 overlap the inner column 12 throughout the length in the axial direction irrespective of a position of the inner column 12 in the axial direction.

Within the inner circumferential surface of the guide tube part 22, regions other than the support surfaces 66 (some regions in the circumferential direction including portions facing each other in a direction of the major axis) are formed into flanks 67. The flanks 67 are located on the same circumference as the support surfaces 66, and continue to the support surfaces 66 in the circumferential direction. That is, the inner circumferential surface of the guide tube part 22 continues smoothly throughout the circumferential direction. The flanks 67 are separated from the outer circumferential surface of the inner column 12 in the radial direction. That is, a distance D2 from the axis O to the flank 67 in the radial direction is longer than the distance D1 from the axis O to the support surface 66.

In this way, in the steering system 1 of the present embodiment, the support surfaces 66 are arranged across the axis O at the positions facing each other in the upward/downward direction, and the flanks 67 are arranged across the axis O at the positions facing each other in the lateral direction.

As illustrated in FIG. 3, a portion located at a lower portion of the guide tube part 22 between the slit 24 and the opening 29 in the axial direction is formed into a bridging part 70. The bridging part 70 is interposed between the slit 24 and the opening 29, and extends in the circumferential direction.

[Operation]

Next, an operation of the aforementioned steering system 1 will be described. First, telescopic movement (front/rear position adjustment) of the steering system 1 will be described. In the following description, when the steering system 1 is in a locked state, this is defined as an initial state.

As illustrated in FIG. 2, when the position of the steering wheel 2 in the forward/backward direction is adjusted, the operation lever 56 is pivotally operated first, so that the steering system 1 is made to be an unlocked state. To be specific, the operation lever 56 is pivotally operated in a direction in which the thickness of the fastening cam 57 is reduced (e.g., downward), and thereby the fastening parts 26 are separated from each other along with the lateral plate parts 51a and 51b, so that the diameter of the holding tube part 21 is increased. Thereby, the pinching of the inner column 12 caused by the holding tube part 21 is released, so that the steering system 1 is made to be an unlocked state.

In the unlocked state, the steering wheel 2 is pushed in the axial direction, and thereby the steering wheel 2 moves forward in the axial direction along with the inner column 12 and the steering shaft 13. Meanwhile, in the unlocked state, the steering wheel 2 is pulled in the axial direction, and thereby the steering wheel 2 moves backward in the axial direction along with the inner column 12 and the steering shaft 13.

Next, after the steering wheel 2 is adjusted to a desired position, the operation lever 56 is pivotally operated, so that the steering system 1 is made to be a locked state. To be specific, the operation lever 56 is pivotally operated in a direction in which the thickness of the fastening cam 57 is increased (e.g., upward), and thereby the fastening parts 26 approach each other along with the lateral plate parts 51a and 51b, so that the diameter of the holding tube part 21 is reduced. Thereby, the inner column 12 is pinched by the holding tube part 21, so that the steering system 1 is made to be a locked state.

As a result, the steering wheel 2 is fixed at a desired position in the forward/backward direction.

Next, an operation of the steering system 1 in the event of secondary collision will be described.

In the event of secondary collision, a collision load directed forward is applied to the steering wheel 2 from a driver. When the collision load is a predetermined value or higher, the steering wheel 2 moves forward relative to the outer column 11 in the axial direction along with the inner column 12 and the steering shaft 13. To be specific, in the steering system 1, the inner column 12 slides on the inner circumferential surface of the holding tube part 21 or on the support surfaces 66 of the guide tube part 22, thereby moving forward relative to the outer column 11 in the axial direction. In the event of secondary collision, a shock load applied to the driver is relieved by sliding resistance or the like between the outer column 11 and the inner column 12.

When the inner column 12 moves forward in the axial direction, the guide rail 54 moves forward relative to the pivot 55 in the axial direction along with the inner column 12, and thereby the pivot 55 enters the load absorption regions 63b and 64b from the telescopic regions 63a and 64a. As illustrated in FIG. 6, the guide rail 54 moves forward relative to the pivot 55 in the first guide hole 63, and thereby the projected segment 63c falls backward. Meanwhile, as illustrated in FIG. 7, the guide rail 54 moves forward relative to the pivot 55 in the load absorption region 64b of the second guide hole 64, and thereby the load absorption region 64b is pushed and widened. Thereby, the shock load in the event of secondary collision can be further relieved.

Meanwhile, as described above, when an input direction of the collision load intersects the axial direction of the inner column, a component force of the collision load acts in the radial direction (the upward/downward direction) perpendicular to the axial direction, and thereby twisting is likely to occur.

In contrast, in the present embodiment, the outer column 11 is configured to have the guide tube part 22 at which the support surfaces 66 supporting the inner column 12 to be movable in the axial direction are formed in front of the slit 24 in the axial direction.

According to this configuration, since rotation of the inner column 12 in the radial direction (e.g., upward) due to the collision load can be regulated, occurrence of the aforementioned twisting can be suppressed. Thereby, since the inner column 12 can be made to smoothly move forward in the axial direction, a desired amount of movement in the axial direction in the event of secondary collision can be secured. As a result, a shock absorption capacity in the event of secondary collision can be further improved.

Furthermore, in the present embodiment, since the flanks 67, which are located on the same circumference as the support surfaces 66 and avoid contact with the inner column 12, are formed on the inner circumferential surface of the guide tube part 22, the guide tube part 22 can be provided with the opening, for instance, in a direction in which the twisting does not easily occur (in the lateral direction in the present embodiment). Thereby, the weight of the outer column 11 can be reduced.

Areas of the support surfaces 66 are changed, and thereby a contact area between the inner column 12 and the guide tube part 22 can be changed. Thereby, since sliding resistance between the inner column 12 and the support surface 66 can be changed, an amount of absorption of the collision load can be changed. For example, a contact area between the inner column 12 and the support surface 66 is increased, and thereby the sliding resistance between the inner column 12 and the support surface 66 can be increased. In this case, for instance, the amount of absorption of the collision load can be increased.

Meanwhile, the contact area between the inner column 12 and the support surface 66 is reduced, and thereby the sliding resistance between the inner column 12 and the support surface 66 is reduced. In this case, the amount of absorption of the collision load can be reduced. In this way, the areas of the support surfaces (and the flanks) are changed, and thereby an amount of absorption (sliding resistance) of the shock load can be changed. For this reason, even when the required amount of absorption of the shock load varies, a desired shock absorption capacity can be obtained with no significant change in design. The contact area between the inner column 12 and the support surface 66 is reduced, and thereby the areas of the flanks 67 are increased, so that a reduction in weight can be achieved.

In the present embodiment, the support surfaces 66 are configured to be arranged at the positions facing each other in the upward/downward direction in a front view, and the flanks 67 are configured to be arranged at the positions facing each other in the lateral direction in a front view.

According to this configuration, the support surfaces 66 are arranged in the upward/downward direction in which the twisting easily occurs, and thereby the twisting can be more reliably suppressed in the event of secondary collision.

In the present embodiment, since the inner shape of the guide tube part 22 is formed in the oval shape, the inner shape of the guide tube part 22 can be simplified. For this reason, the aforementioned operations and effects are exerted while improving manufacturing efficiency.

In the present embodiment, the opening 29 is formed across the guide tube part 22 at the portions located on a side opposite to the slit 24 in the axial direction.

According to this configuration, the weight of the outer column 11 can be further reduced while the occurrence of the aforementioned twisting is suppressed.

Modified Examples

Next, a modified example of the aforementioned embodiment will be described.

Figure 9:
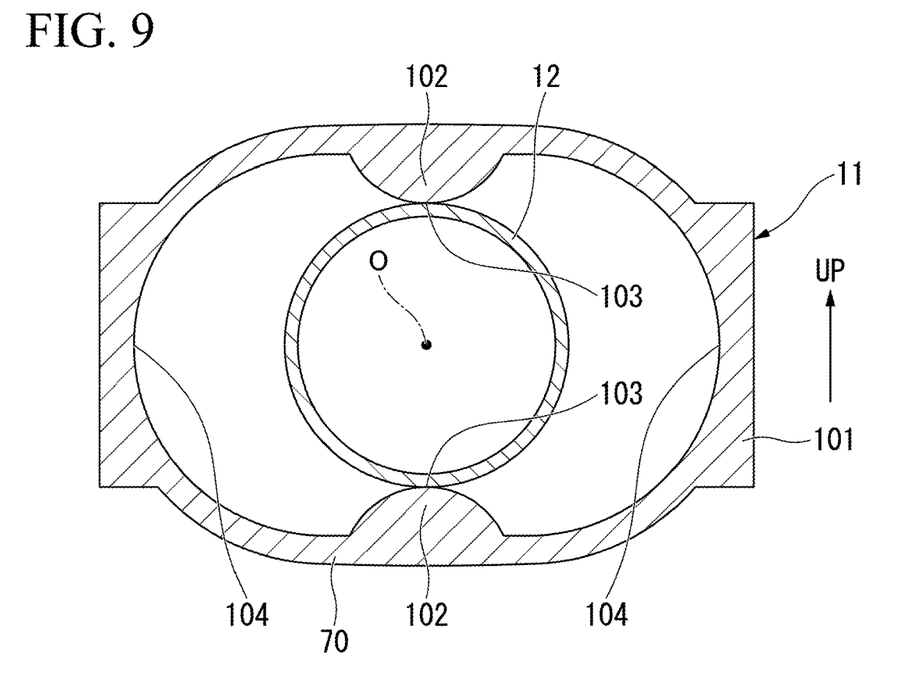
FIG. 9 is an outlined sectional view illustrating a modified example of a guide tube part.

In the aforementioned embodiment, the case in which the inner shape of the guide tube part 22 is formed in the oval shape and the inner circumferential surface of the guide tube part 22 is connected smoothly has been described, but the embodiment is not limited thereto. For example, an inner shape of a guide tube part 101 illustrated in FIG. 9 is formed in an oval shape in which the lateral direction is set as a direction of a major axis. Support protrusions 102 swelling toward the axis O are formed on an inner circumferential surface of the guide tube part 101 at positions facing each other in the upward/downward direction. Each of the support protrusions 102 is formed in a semi-circular shape in a front view viewed in the axial direction. In this case, the tops of the support protrusions 102 become support surfaces 103 sliding on the outer circumferential surface of the inner column 12. Meanwhile, within the inner circumferential surface of the guide tube part 101, portions other than the support surfaces 103 become flanks 104 keeping away from the outer circumferential surface of the inner column 12.

Figure 10:
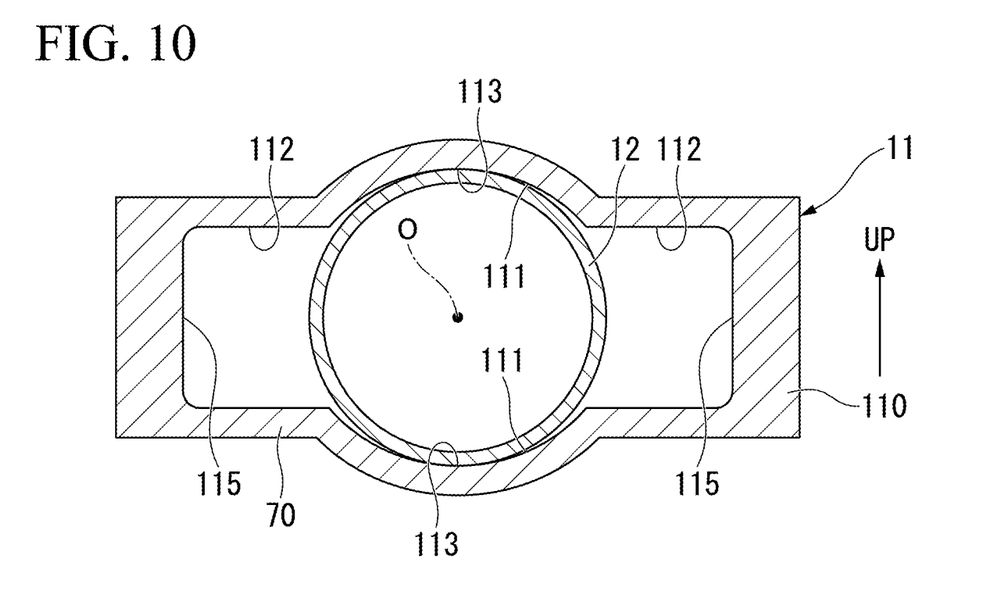
FIG. 10 is an outlined sectional view illustrating a modified example of the guide tube part.

An inner shape of a guide tube part 110 illustrated in FIG. 10 is defined by round parts 111 and pocket parts 112 recessed from inner circumferential surfaces of the round parts 111 in the lateral direction.

In the illustrated example, the round parts 111 are each formed, for instance, in an oval shape in which the lateral direction is set as a major axis. Some regions of the inner circumferential surfaces of the round parts 111 in the circumferential direction wherein the regions include portions facing each other in the upward/downward direction are formed into support surfaces 113. A shape of each round part 111 (a length between the axis O and the inner circumferential surface of each round part 111, a radius of curvature of the inner circumferential surface, etc.) can be appropriately changed. That is, each round part 111 may have a perfectly circular shape or an oval shape.

Figure 11:
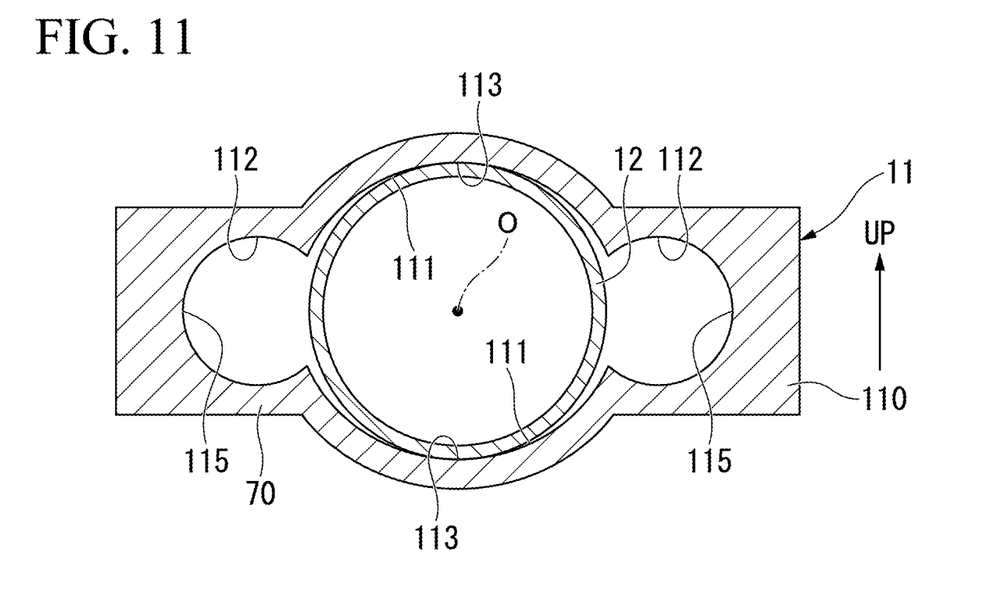
FIG. 11 is an outlined sectional view illustrating a modified example of the guide tube part.

The pocket parts 112 are each formed in a rectangular shape in a front view viewed in the axial direction. Inner circumferential surfaces of the pocket parts 112 and opposite ends of the round parts 111 in the circumferential direction become flanks 115 keeping away from the outer circumferential surface of the inner column 12. Like a guide tube part 110 illustrated in FIG. 11, each of the pocket parts 112 may be formed in a circular shape. Each of the pocket parts may be formed in a triangular shape or the like.

In this way, the inner shape of the guide tube part is changed, and thereby areas of the support surfaces and the flanks can be changed. As a result, as described above, the contact area between the inner column 12 and the support surface is increased, and thereby the amount of absorption of the collision load can be increased. On the other hand, the contact area between the inner column 12 and the support surface is reduced, and thereby the areas of the flanks are increased, so that a reduction in weight can be achieved. In the configurations of FIGS. 8 to 11 described above, the contact area between the inner column 12 and the support surface is increased in the order of the configuration of FIG. 9, the configuration of FIG. 8, the configuration of FIG. 10, and the configuration of FIG. 11.

The technical scope of the prevent invention is not limited to each of the aforementioned embodiments, and includes modifying the aforementioned embodiments in various ways without departing from the scope of the present invention.

For example, in the aforementioned embodiments, the configuration in which the axis O intersects the forward/backward direction has been described, but the present invention is not limited to this configuration. The axis O may be matched with the forward/backward direction of the vehicle 3, and be inclined in the lateral direction.

Figure 12:
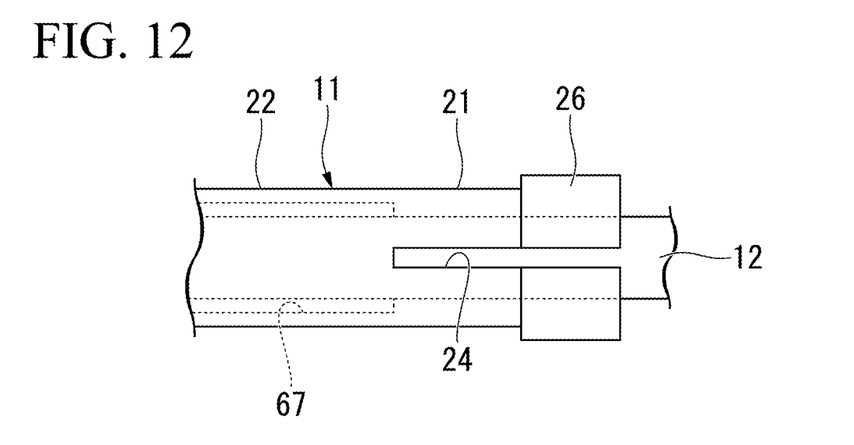
FIG. 12 is an outlined bottom view of the steering system which illustrates another configuration of the embodiment.
Figure 13:
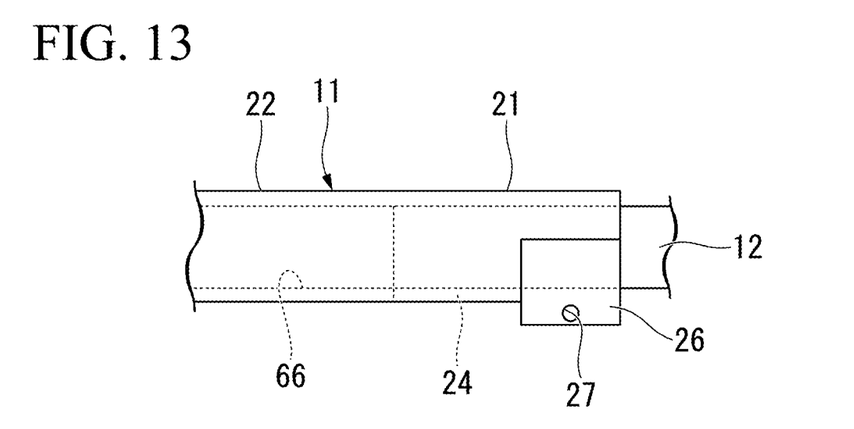
FIG. 13 is an outlined side view of the steering system which illustrates another configuration of the embodiment.

In the aforementioned embodiments, the configuration in which the large-diameter tube part 23 having the opening 29 is formed at the outer column 11 has been described, but the present invention is not limited to this configuration. For example, as illustrated in FIGS. 12 and 13, the outer column 11 may be configured to have only the holding tube part 21 and the guide tube part 22 (be configured not to have the large-diameter tube part 23). For example, as in the aforementioned embodiments, the guide tube part 22 has support surfaces 66 and flanks 67. In the examples of FIGS. 12 and 13, an inner shape of the guide tube part 22 is uniformly formed throughout the axial direction. However, only at least a part of the guide tube part 22 in the axial direction may have the support surfaces 66 and the flanks 67.

In the aforementioned embodiments, the configuration in which the support surfaces are arranged across the axis O in pair at the positions facing each other in the upward/downward direction has been described, but the present invention is not limited to this configuration. The positions at which the support surfaces are arranged, the number of arranged support surfaces, etc. can be appropriately changed according to the direction in which the twisting easily occurs, the amount of the collision load to be absorbed of, or the like. For example, the support surfaces may be arranged at positions facing each other in the lateral direction. One or three or more support surfaces may be arranged. However, the support surfaces are preferably arranged on opposite sides across one straight line among straight lines extending in the radial direction at least one by one.

In the aforementioned embodiments, the configuration in which the inner shape of the guide tube part is formed in the circular shape as a whole has been described, but the present invention is not limited to this configuration. The inner shape of the guide tube part may be a rectangular shape, a triangular shape, or the like.

In the aforementioned embodiments, the case in which the holding part is the tubular holding tube part 21 has been described, but the present invention is not limited to this configuration. The holding part may be configured to be able to hold the inner column 12 by expansion/contraction of the slit 24.

Further, in the aforementioned embodiments, the case in which the holding part regulates and releases the movement of the inner column 12 by increasing/reducing the interval of the slit 24 has been described, but the present invention is not limited to this configuration. For example, the holding part may be configured to regulates and releases the movement of the inner column 12 relative to the outer column 11 by a cam member or the like that is mounted on the pivot 55.

In addition, the components in the aforementioned embodiments may be appropriately substituted with well-known components without departing from the spirit and scope of the present invention and furthermore, and the aforementioned modified examples may be appropriately combined. The present invention is not limited by the above description, but is only limited by the appended claims.

What is claimed is:

1. A steering system comprising:
   an inside member configured to extend along an axis and to have a steering wheel mounted on a first end side in an axial direction;
   an outside member comprising a guide tube part into which the inside member is inserted to support the inside member to be movable in the axial direction, and a holding part which is located on the first end side in the axial direction with respect to the guide tube part and in which a slit extending in the axial direction is formed; and
   a telescopic adjustment mechanism configured to switch between a locked state in which an interval of the slit is reduced and movement of the inside member relative to the outside member is regulated by the holding part and an unlocked state in which the interval of the slit is increased and the movement of the inside member relative to the outside member is allowed,
   wherein an inner circumferential surface of the guide tube part comprises:
   support surfaces that slidably support an outer circumferential surface of the inside member, and
   flanks that are located on the same circumference as the support surfaces and are separated from the outer circumferential surface of the inside member in a radial direction.

2. The steering system according to claim 1, wherein:
   the support surfaces are arranged at positions facing each other in an upward/downward direction of a vehicle in a front view in the axial direction; and
   the flanks are arranged at positions facing each other in a width direction of the vehicle in the front view in the axial direction.

3. The steering system according to claim 1, wherein:
   an inner shape of the guide tube part is formed in an oval shape;
   portions of the guide tube part which face each other in a direction of a minor axis are set as the support surfaces; and
   portions of the guide tube part which face each other in a direction of a major axis are set as the flanks.

4. The steering system according to claim 1, wherein an opening passing through the outside member in the radial direction are formed at portions of the outside member which are located on a second end side in the axial direction with respect to the guide tube part.

5. A steering system comprising:
   an inside member configured to extend along an axis and to have a steering wheel mounted on a first end side in an axial direction;
   an outside member comprising a guide tube part into which the inside member is inserted to support the inside member to be movable in the axial direction, and a holding part that is located on the first end side in the axial direction with respect to the guide tube part; and
   a telescopic adjustment mechanism configured to switch between a locked state in which movement of the inside member relative to the outside member is regulated by the holding part and an unlocked state in which the movement of the inside member relative to the outside member is allowed,
   wherein an inner circumferential surface of the guide tube part comprises:
   support surfaces that slidably support an outer circumferential surface of the inside member, and
   flanks that are located on the same circumference as the support surfaces and are separated from the outer circumferential surface of the inside member in a radial direction.

* * * * *